No. 838,976. PATENTED DEC. 18, 1906.
J. F. GEORGE.
HINGE WASHER.
APPLICATION FILED NOV. 29, 1904.

Witnesses
Frank W. Hough
P. S. Elmore

Inventor
J. F. George.
By Victor J. Evans
Attorney

UNITED STATES PATENT OFFICE.

JAMES F. GEORGE, OF CHUNCHULA, ALABAMA.

HINGE-WASHER.

No. 838,976.  Specification of Letters Patent.  Patented Dec. 18, 1906.

Application filed November 29, 1904. Serial No. 234,806.

*To all whom it may concern:*

Be it known that I, JAMES F. GEORGE, a citizen of the United States of America, residing at Chunchula, in the county of Mobile and State of Alabama, have invented new and useful Improvements in Hinge-Washers, of which the following is a specification.

My invention has relation to improvements in hinge-washers; and it consists in the construction and arrangement of parts, as will be hereinafter described, and particularly pointed out in the claim.

Figure 1:
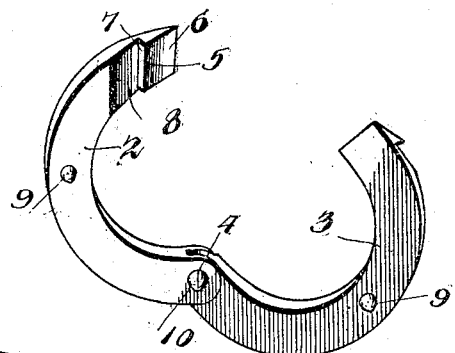
Figure 2:
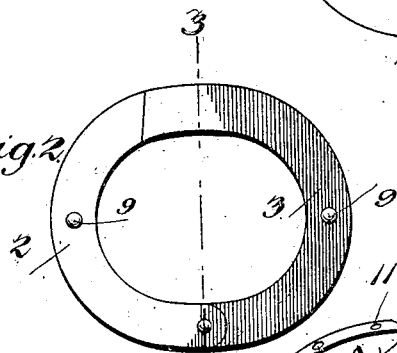
Figure 3:
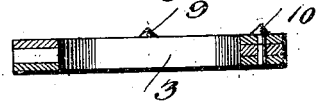
Figure 4:
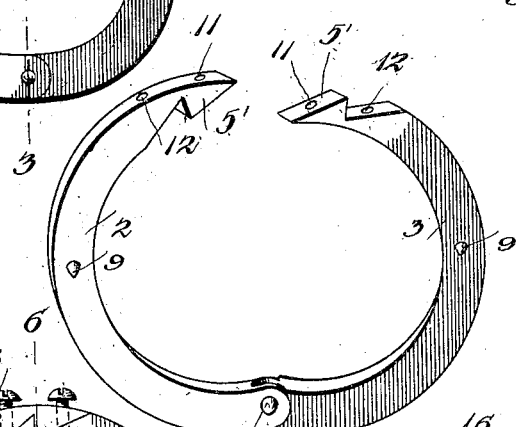
Figure 6:
Figure 5:
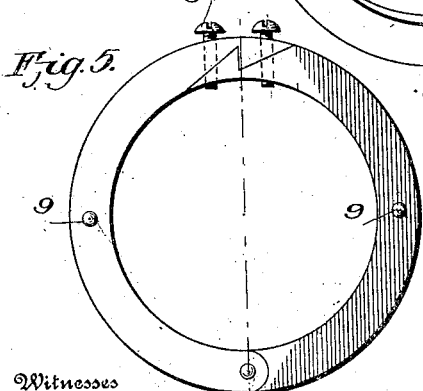
Figure 7:
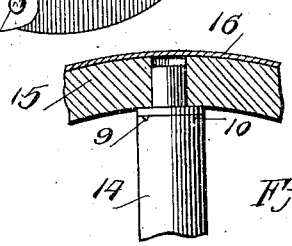

In the accompanying drawings, Figure 1 is a perspective view of a washer, illustrating one form of embodiment of the invention and the device in open position. Fig. 2 is a plan view of the device, showing the sections thereof in closed position. Fig. 3 is a section taken on the line 3 3 of Fig. 2. Fig. 4 is a view similar to Fig. 1, illustrating another form of the embodiment of the invention. Fig. 5 is a plan view of the device illustrated in Fig. 4 and showing the sections in closed position. Fig. 6 is a section taken on the line 6 6 of Fig. 5. Fig. 7 is a detail view, partly in section, showing the device applied for use as a tire-tightener.

Referring to the drawings, and particularly to Figs. 1 to 3, 1 designates the washer, which is of substantially annular form and comprises a pair of sections 2 and 3, pivotally connected by means of a transverse pintle 4 and adapted for relative swinging movement from the open position shown in Fig. 1 to the normal closed position illustrated in Fig. 2, there being formed upon the free meeting ends of the sections engaging portions or heads 5, adapted for interengagement to maintain the sections in closed position. These heads 5 have correspondingly-beveled inner faces 6, terminating at their inner ends in shoulders 7, there being in rear of each head a recess 8, shaped to conform to and constituting a seat for the head of the companion section.

Provided on each of the sections 2 and 3 is a laterally-projected pointed lug or spur 9, while the head of the pintle 4 is shaped to produce a corresponding lug or spur 10, these spurs serving when the washer is employed as a tire-tightener, as illustrated in Fig. 7, by embedding in the end of the spoke to retain the washer in position upon the latter.

In practice the device may when employed as a washer be readily seated upon the valve-stem of a faucet by disengaging the heads 5 and moving the sections to open position, as illustrated in Fig. 1, thus obviating the removal of the taps from the valve-stem. The device having been seated upon the stem is arranged in its normal closed position, as illustrated in Fig. 2, whereupon the heads 5 will interengage, thus locking the sections in closed position.

In the form of device illustrated in Figs. 4 to 6 the heads 5' are formed upon the free ends of the sections at right angles to the transverse axis of the latter and are perforated, as at 11, these perforations being adapted when the sections are in closed position to register with corresponding perforations 12 for the reception of screws or other fastenings, members 13, which constitute auxiliary means for securing the sections in locked position and serve the further function of fixing the device in position upon a shaft when the device is employed as a shaft-collar. In other respects the construction and operation are identical with that above described.

In Fig. 7 I have illustrated the washer applied as a tire-tightener and in which the wheel-spoke 14 is partly withdrawn from engagement with the felly 15 and the washer 2 applied around the spindle 16 between the inner face of the felly and adjacent end of the spoke. When so applied, the spurs 9 and 10 become embedded in the material of the spoke, thus preventing escape of the washer from position upon the latter.

From the foregoing it is apparent that I produce a simple inexpensive device which may be employed for a variety of purposes and one which in practice will efficiently perform its functions to the attainment of the ends in view, it being understood that minor changes in the details herein set forth may be resorted to without departing from the spirit of the invention.

Having thus described the invention, what is claimed as new is—

A hinge-washer comprising a pair of flat-faced semicircular sections, a pivot-pin for securing the sections together, means to permit of fastening the free ends of the sections together, and single sharpened spurs arranged on one face of each section and said pivot-pin being also provided with a sharpened spur, substantially as specified.

In testimony whereof I affix my signature in presence of two witnesses.

JAMES F. GEORGE.

Witnesses:
 LUTHER ROBERTS,
 J. S. ELERY.